United States Patent [19]
Nomura et al.

[11] Patent Number: 5,598,241
[45] Date of Patent: Jan. 28, 1997

[54] CAMERA HAVING A LENS OPENING

[75] Inventors: Hiroshi Nomura; Takamitsu Sasaki, both of Tokyo, Japan

[73] Assignee: Asahi Kogaku Kogyo Kabushiki Kaisha, Tokyo, Japan

[21] Appl. No.: 353,212

[22] Filed: Dec. 1, 1994

[30] Foreign Application Priority Data

Dec. 6, 1993 [JP] Japan ................................. 5-305455

[51] Int. Cl.⁶ ........................... G03B 3/00; G03B 5/00; G03B 13/36
[52] U.S. Cl. ........................... 396/79; 396/133; 396/349
[58] Field of Search ........................... 354/154, 187, 354/195.1, 195.12, 233, 400

[56] References Cited

U.S. PATENT DOCUMENTS

| | | |
|---|---|---|
| 4,864,338 | 9/1989 | Wakabayashi ........................... 354/187 |
| 4,944,030 | 5/1993 | Haraguchi et al. . |
| 5,012,273 | 4/1991 | Nakamura et al. . |
| 5,016,032 | 5/1991 | Haraguchi et al. . |
| 5,051,765 | 9/1991 | Yoshizaki et al. ........................... 354/187 |
| 5,142,315 | 8/1992 | Haraguchi et al. . |
| 5,144,493 | 9/1992 | Nomura . |
| 5,150,145 | 9/1992 | Haraguchi et al. . |
| 5,157,429 | 10/1992 | Haraguchi et al. . |
| 5,214,462 | 5/1993 | Haraguchi et al. . |
| 5,264,885 | 5/1993 | Haraguchi et al. . |
| 5,276,475 | 1/1994 | Haraguchi et al. . |
| 5,313,329 | 5/1994 | Ueda . |

*Primary Examiner*—A. A. Mathews
*Attorney, Agent, or Firm*—Greenblum & Bernstein P.L.C.

[57] ABSTRACT

A camera includes a photographic optical system including a focusing lens group located at the front of the photographic optical system and a lens frame for supporting the focusing lens group, which projects forwardly from an infinite focus position to a shortest focus position for a focusing operation. A lens opening is provided on the camera, which exposes the focusing lens group to outside the camera. The lens opening is formed so as to allow the lens frame to project forwardly through the lens opening when the lens frame moves to the shortest focus position.

19 Claims, 9 Drawing Sheets

CAMERA HAVING A LENS OPENING

BACKGROUND OF THE INVENTION

1. Field of the Invention

The present invention relates to a camera having a lens opening formed at the front of a photographic lens system, in which the frontmost lens group of the photographic lens system moves along the optical axis of the photographic lens system to perform a focusing operation.

2. Description of the Related Art

In recent years, compact cameras with a built-in barrier device for opening and closing a lens opening of a camera have been generally used. As one example of such cameras, there is a camera provided with a barrier device including a barrier block mounted at the front end of a lens barrel which advances and retracts between a shooting position, (extended position) and an accommodated position in the direction of an optical axis of the photographing optical system. The barrier is closed when the lens barrel is in the accommodated position and is opened when the lens barrel is extended to the shooting position.

In the compact cameras having the barrier device described above and also a frontmost lens group in moved between an infinite focus position to a nearest focus position for a focusing operation, it is required that the lens opening and blades of the barrier device be placed at a position farther forward from the frontmost lens group so that the frontmost lens group may not touch an edge of the lens opening or the retracted barrier blades when the frontmost lens group forwardly projects for the focusing operation.

Recently, it has been strongly requested to further reduce the size of compact cameras, so much so that the space required to mount the lens opening and the barrier blades at a position further forward from the frontmost lens group in the optical axis direction must be reduced.

SUMMARY OF THE INVENTION

It is therefore an object of the present invention to provide a camera having a lens opening that enables reducing the thickness of the camera body, particularly when the lens group is accommodated in the camera body.

According to one aspect of the present invention, there is provided a camera which includes a photographic optical system including a focusing lens group located at the front of the photographic optical system. A lens frame is provided for supporting the focusing lens group, the lens frame projecting forwardly from an infinite focus position to a shortest focus position for a focusing operation. A lens opening in provided on the camera, the lens opening exposing the focusing lens group to outside of the camera, wherein the lens opening is formed to as to allow the lens frame to project forwardly through the lens opening when the lens frame moves to the shortest focus position.

According to another aspect of the present invention, there is provided a lens shutter type camera which includes a photographic optical system including a focusing lens group located at the front of the photographic optical system and a lens frame for supporting the focusing lens group. The lens frame projects forwardly from an infinite focus position to a shortest focus position for a focusing operation. A lens opening is provided on the camera, the lens opening exposing the focusing lens group to outside the camera and a barrier mechanism is provided for protecting the photographic optical system, wherein the barrier mechanism includes at least one barrier blade for opening and closing the lens opening. The barrier mechanism is placed at a position where the barrier blade, when closing the lens opening, shields with the lens frame when the lens frame moves to the shortest focus position.

According to another aspect of the present invention, there is provided a lens shutter type camera having an auto-focus mechanism. The camera includes a lens frame for supporting a frontmost lens of a photographic optical system, the auto-focus mechanism driving the lens frame to move forwards from an infinite focus position to a shortest focus position. A lens opening in provided on the camera, the lens opening exposing the frontmost lens to outside the camera, wherein the lens opening is formed larger than the lens frame so that the lens frame may project forwards through the lens opening when the auto-focus mechanism drives the lens frame to move to the shortest focus position.

The present disclosure relates to subject matter contained in Japanese patent application No. 5-305455 (filed on Dec. 6, 1993) which is expressly incorporated herein by reference in its entirety.

BRIEF DESCRIPTION OF THE DRAWINGS

The present invention will be more apparent from the following description with reference to the accompanying drawings wherein.

DETAILED DESCRIPTION OF PREFERRED EMBODIMENTS

In a zoom lens barrel to which the present invention is applied, a zoom lens optical system includes a front lens group L1 and a rear lens group L2. A focusing operation is carried out by means of a movement of the front lens group L1 as it travels in the direction of the optical axis O of the zoom lens system.

Figure 7:
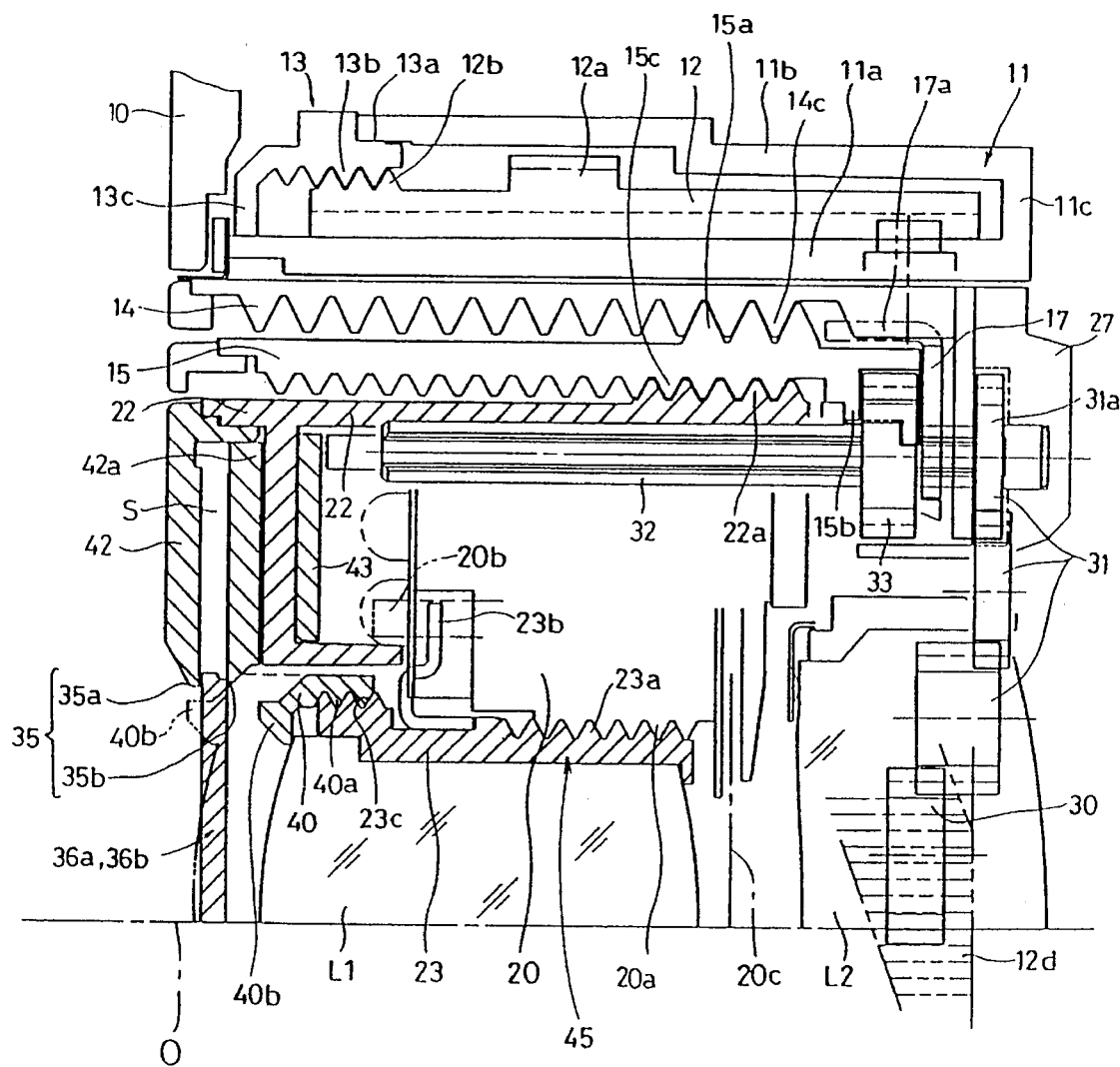
FIG. 7 is a lateral cross-sectional view of the upper half of the accommodated lens barrel according to the present invention.
Figure 8:
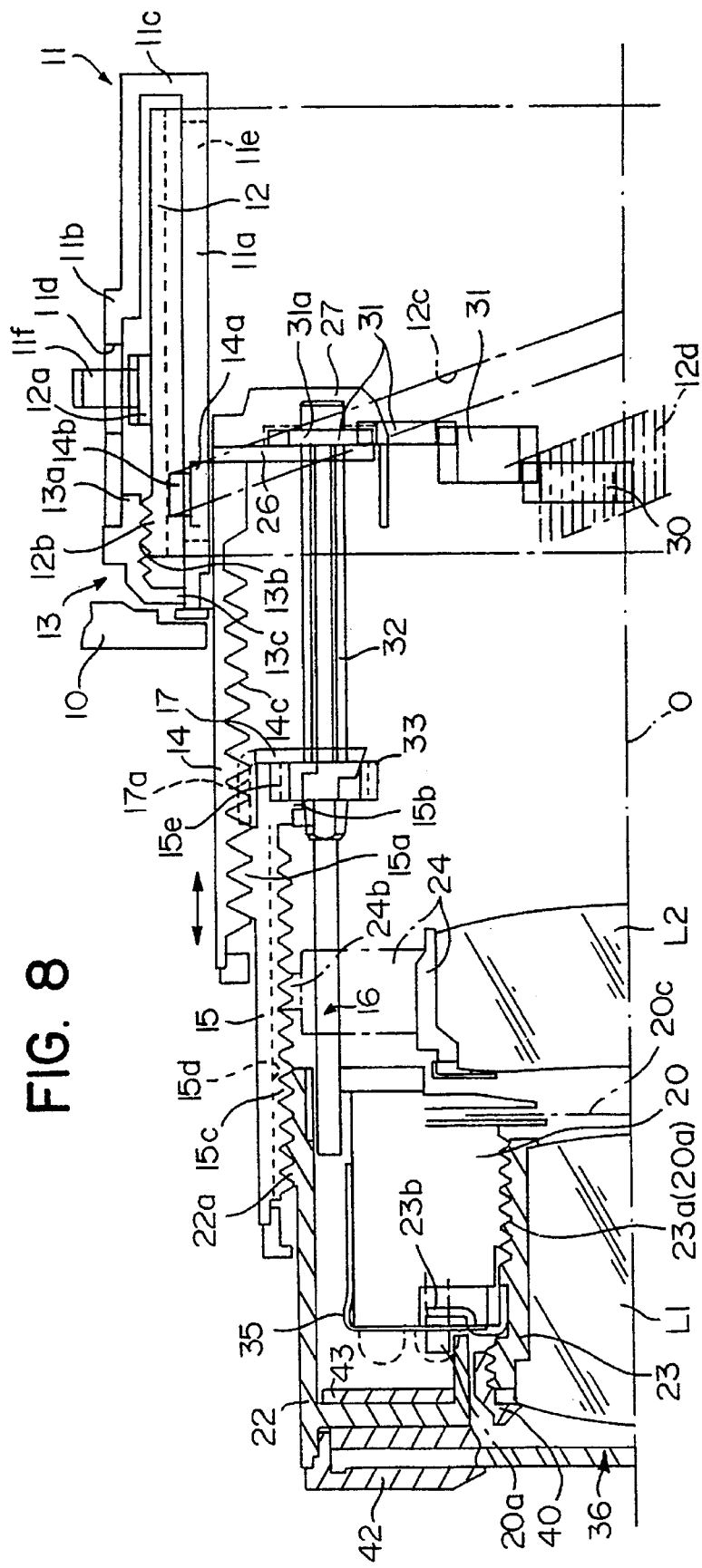
FIG. 8 is a lateral cross-sectional view of the upper half of the extended lens barrel shown in FIG. 7; and, FIG. 9 is a schematic front view of the lens barrel to which the present invention is applied.

As illustrated in FIGS. 7 and 8, a fixed lens barrel 11 is integrally formed with the camera body 10 to which the present invention is applied and is provided with an inner cylinder 11a and an outer cylinder 11b. The rear ends of the inner and outer cylinders 11a and 11b are connected to each other through the connecting wall 11c, and the front ends of the inner and outer cylinders 11a and 11b are open. A rotation cylinder (or ring) 12, which is inserted from the open end of the cylinders 11a and 11b, is rotatably mounted on the outer periphery of the inner cylinder 11a. Three straight guide grooves 11e each extending in a direction parallel to the optical axis O are formed on the inner cylinder 11a. Only one of the straight guide grooves 11e is shown in FIG. 8.

Figure 2:
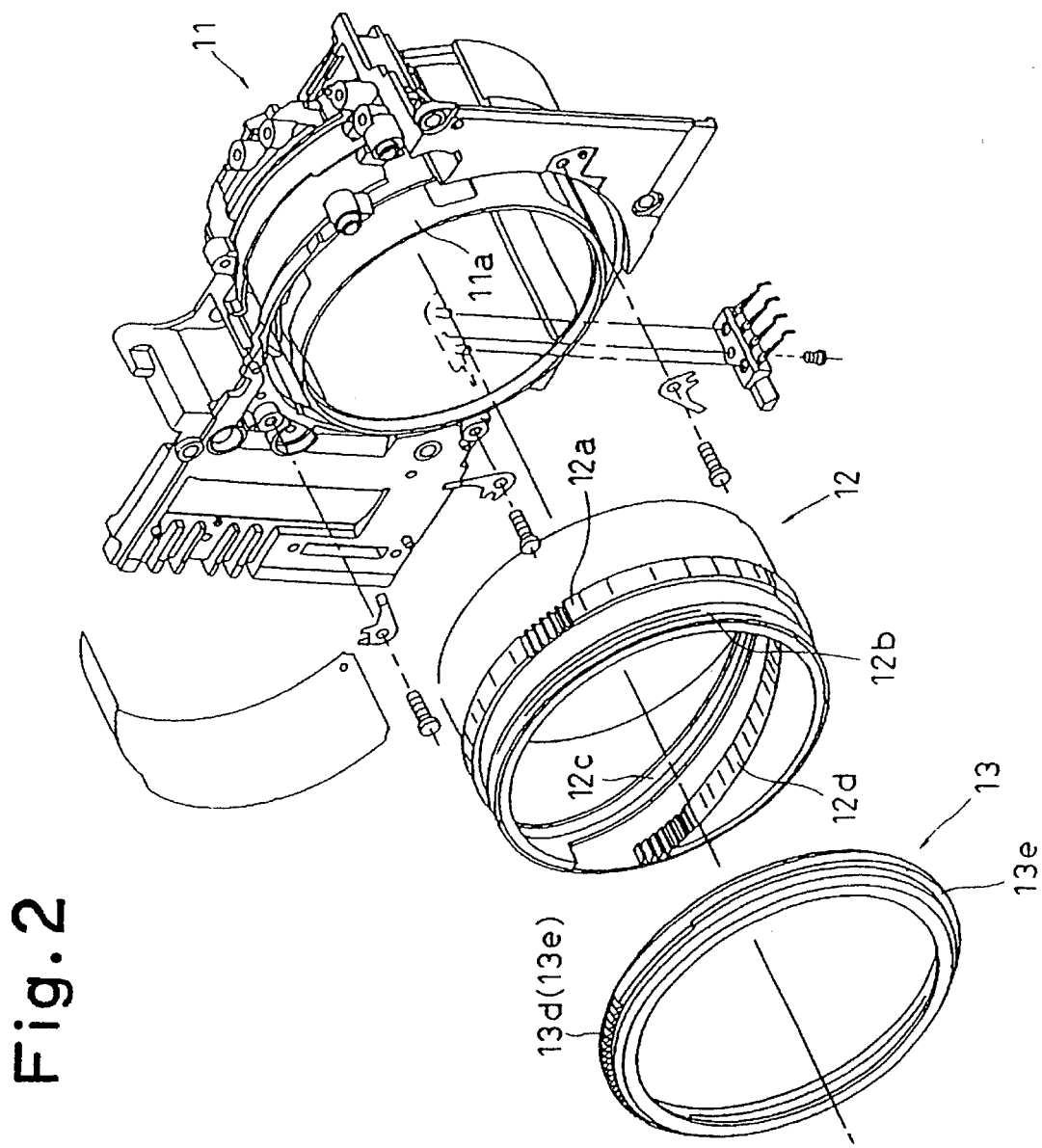
FIG. 2 is an enlarged isometric view of the rear portion of the lens barrel shown in FIG. 1.

A spur gear 12a is integrally formed with the rotation cylinder 12 at an outer periphery thereof and a fine thread 12b is integrally formed with the cylinder 12 at a front tip of the outer peripheral portion thereof. On the inner wall of the rotation cylinder 12 are formed three lead grooves 12c parallel to one another and each inclined with respect to the circumferential direction of the cylinder 12, and as inclined inner gear 12d parallel to the lead grooves 12c. Only one of the three lead grooves 12c is shown in FIGS. 2 and 8.

A support ring 13 is secured to the front open end of the inner cylinder 11a and outer cylinder 11b of the fixed lens barrel 11. The support ring 13 includes a portion 13a engaging the inner surface of the outer cylinder 11b; a thread portion 13b engaging the fine threaded 12b; a portion 13c contacting an outer surface of the inner cylinder 11a; and an outer flange 13e. The support ring 13 is pressed toward the fixed lens barrel 11 by a spring means (not shown) and is retained at a predetermined position. Reference symbol 13d is a gear formed on an outer periphery of the support ring 13 for the adjustment of the position of the rotational ring 12 in the direction of the optical axis O. The support ring 13 also functions to strengthen the edge of the inner cylinder 11a and the outer cylinder 11b.

A notch 11d for allowing the pinion 11f to mesh with the spur gear 12a is provided on the outer cylinder 11b of the fixed lens barrel 11, and other notches similar to the notch lid are formed on the inner cylinder 11a to expose the lead grooves 12c and the inner gear 12d.

Figure 3:
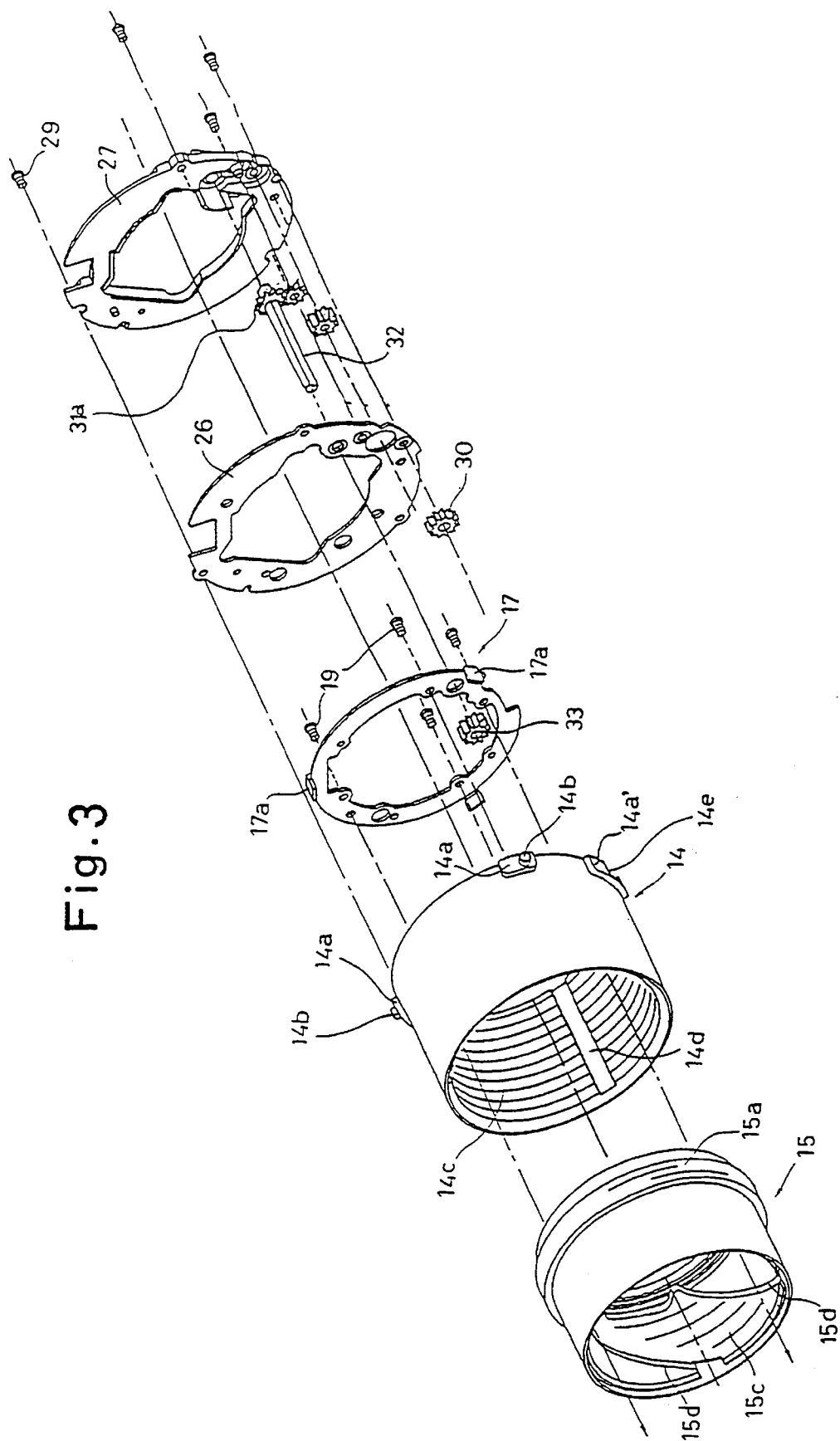
FIG. 3 is an enlarged isometric view of the intermediate portion of the lens barrel shown in FIG. 1.

A first cylinder 14 moving in the optical axis direction fits in the inner cylinder 11a of the fixed lens barrel 11. Three straight guide projections 14a are integrally formed with the outer periphery of the first cylinder 14 and engage the guide grooves 11e of the fixed lens barrel 11. Only one of the three straight guide projections 14a is shown in FIG. 8. A pin 14b engaging the corresponding lead groove 12c of the rotation cylinder 12 is formed on each of the guide projections 14a. A female helicoid 14c and three straight guide grooves 14d parallel to the optical axis O are formed on the inner wall of the first cylinder 14. Only one of the three straight guide grooves 14d can be seen in FIG. 3. With the construction described above, the rotation of the rotation cylinder 12 causes the first cylinder 14 to move in the direction of the optical axis O without rotating by means of the guide grooves 11e and the lead grooves 12c.

Inside the first cylinder 14 a second cylinder (i.e., cam ring) 15 is accommodated, and at a rear portion of the outer periphery of the second cylinder 15 a male helicoid 15a is formed and engages the female helicoid 14c of the first cylinder 14. A straight guide member 16 is situated in the second cylinder 15, and a straight guide plate 17 is fixed to a rear end portion of the guide member 16 by fastening screws 19. An inner flange 15b is integrally formed with the second cylinder 15 between the guide member 16 and the guide plate 17 so as to rotate in relation to the guide member 16 and the guide plate 17 as illustrated in FIG. 7 and 8. Three straight guide keys 17a are formed on the periphery of the guide plate 17 and engage the guide grooves 14d of the first cylinder 14. As a result, the guide member 16 and the guide plate 17 rotate in relation to the second cylinder 15 and they integrally move in the direction of the optical axis O. In other words, the second cylinder 15 is rotatable and movable in the optical axis direction at the same time by means of the male and female helicoids 15a and 14c on one hand, and on the other hand, the guide member 16 and the guide plate 17 are movable together with the second cylinder 15 in the direction of the optical axis O without rotating.

Figure 1:
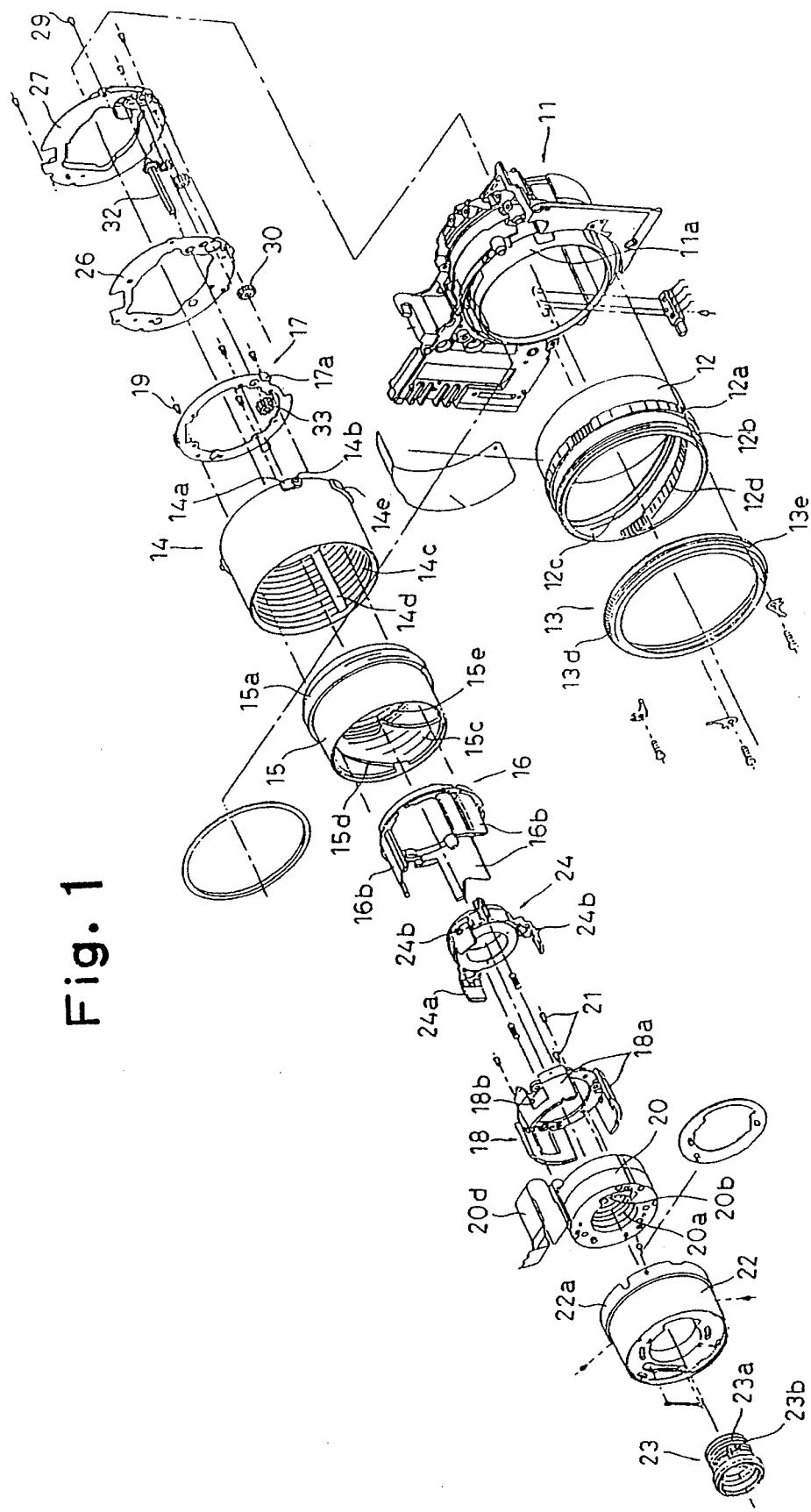
FIG. 1 is an exploded isometric view of an overall lens barrel according to a embodiment of the present invention.

The guide member 16 is provided with three straight keys 16b each extending in a direction parallel to the optical axis O as illustrated in FIG. 1. A guide member 18 for linearly guiding the front lens group L1 is provided with three straight keys 18a engaging the three keys 16b and and each extending in a direction parallel to the optical axis O. A shutter block 20 is secured to the front lens group guide member 18 through fastening screws 21 and is further secured to the front lens group supporting cylinder 22. As a result, the shutter block 20 and the front lens group supporting cylinder 22 are prevented from rotating and are allowed to move only in the direction of the optical axis O.

Figure 4:
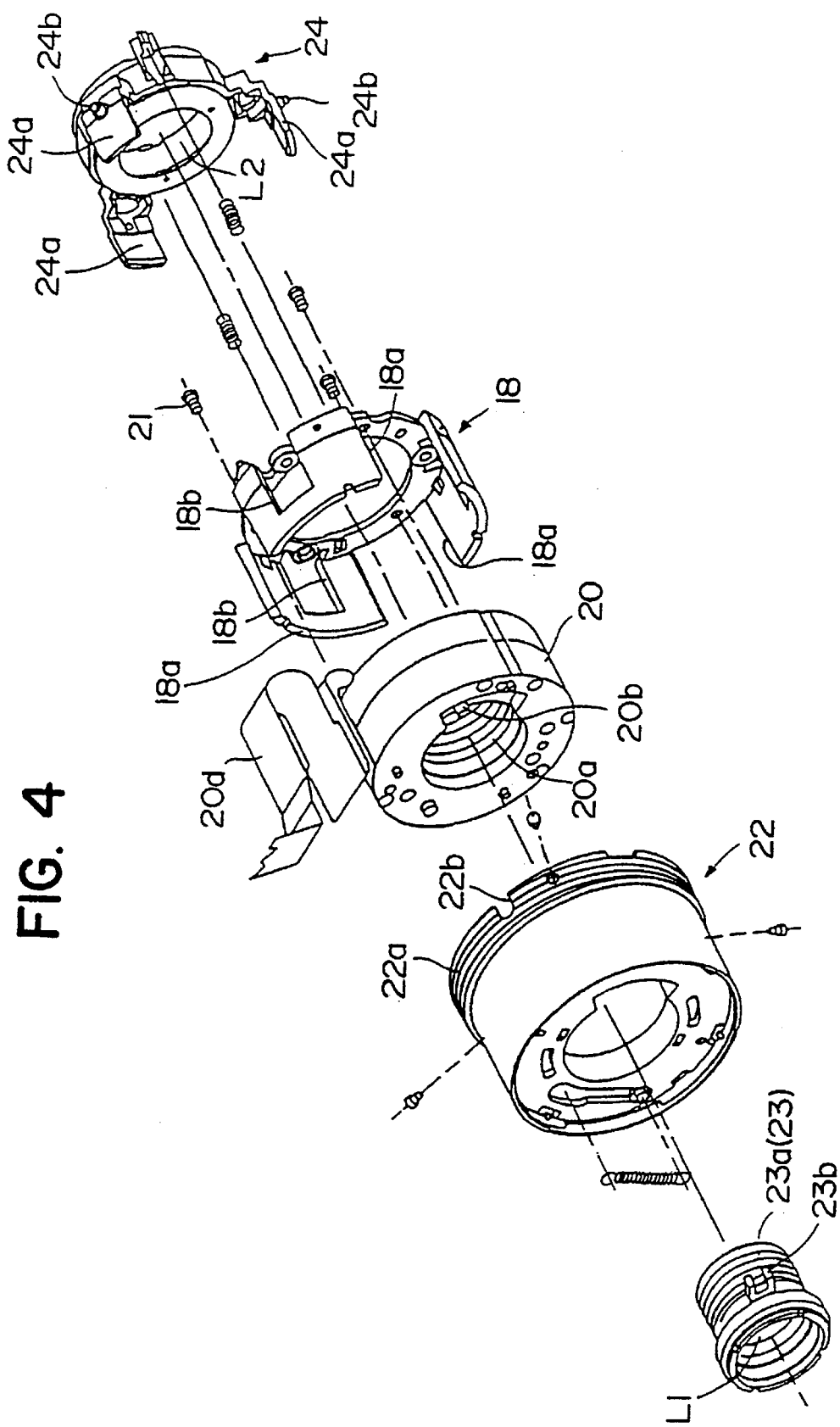
FIG. 4 is an enlarged isometric view of the front portion of the lens barrel shown in FIG. 1.

As illustrated in FIGS. 1 and 4, the shutter 20 block is provided on its inner periphery with a female helicoid 20a extending parallel to the optical axis O, and a male helicoid 23a of a lens supporting ring 23 supporting the front lens group L1 is engaged with the female helicoid 20a. A ring 40 for fixing the front lens group L1 to the lens supporting ring 23 screw-engages the front end of the lens supporting ring 23. The lens supporting ring 23 and the ring 40 constitutes a front lens group supporting frame 45 (FIG. 7). At the rear end of the outer periphery of the front lens group supporting cylinder 22, a male helicoid 22a is formed to move the front lens supporting ring 23 in the direction of the optical axis O during a zooming operation. The shutter block 20 is provided with blades 20c, and driving signals are supplied to the shutter block 20 through a flexible printed circuit board (FPC board) 20d.

A rear lens group guiding slot 18b is formed on each of the straight keys 18a of the front lens group guide member 18 for linearly moving the rear lens group L2 in the direction of the optical axis O. The rear lens group L2 is secured to the rear lens frame 24. Three straight keys 24a engaging the rear lens frame 24. A cam pin 24b is formed on each of the keys 24a so as to project in a radial direction therefrom.

A female helicoid 15c and three cam grooves 15d are formed on the inner periphery of the second cylinder 15. The female helicoid 15c engages a male helicoid 22a of the front lens group supporting cylinder 22, and the cam grooves 15d engage the cam pins 24b of the rear lens frame 24. The cam grooves 15d meet with the female helicoid 15c such that a part of the female helicoid 15c is removed. When assembled, the cam pins 24 b of the rear lens frame 24 are engaged with open grooves 22b of the front lens group supporting cylinder 22, and under this condition, the cam pins 24b are engaged with the cam grooves 15d and the male helicoid 22a is engaged with the female helicoid 15c. Under these conditions, the rotation of the second cylinder 15 causes the front lens group supporting cylinder 22 (front lens group L1) to linearly move in the direction of the optical axis O due to the relationships between the female helicoid 15c and the male helicoid 22a and between the keys 16b of the guide member 16 and the keys 18a of the front lens guide member 18. Further, the rotation of the second cylinder 15 causes the rear lens frame 24 (rear lens group L2) to move along a predetermined path in the direction of the optical axis O due to the relationships between the cam grooves 15d and the cam pins 14b and between the keys 24a of the rear lens frame 24 and the rear lens group guiding slots 18b of the front lens guide member 18 to thereby effect zooming.

As explained above, when the rotation cylinder 12 is driven, the first cylinder 14 linearly moves in the direction of the optical axis O, and when the second cylinder 15 is rotated in relation to the first cylinder 14 the second cylinder 15 moves in the direction of the optical axis O while rotating. As a result, the front lens group L1 and the rear lens group L2 linearly move while the distance between the two lens groups changes to thereby effect zooming.

Figure 5:
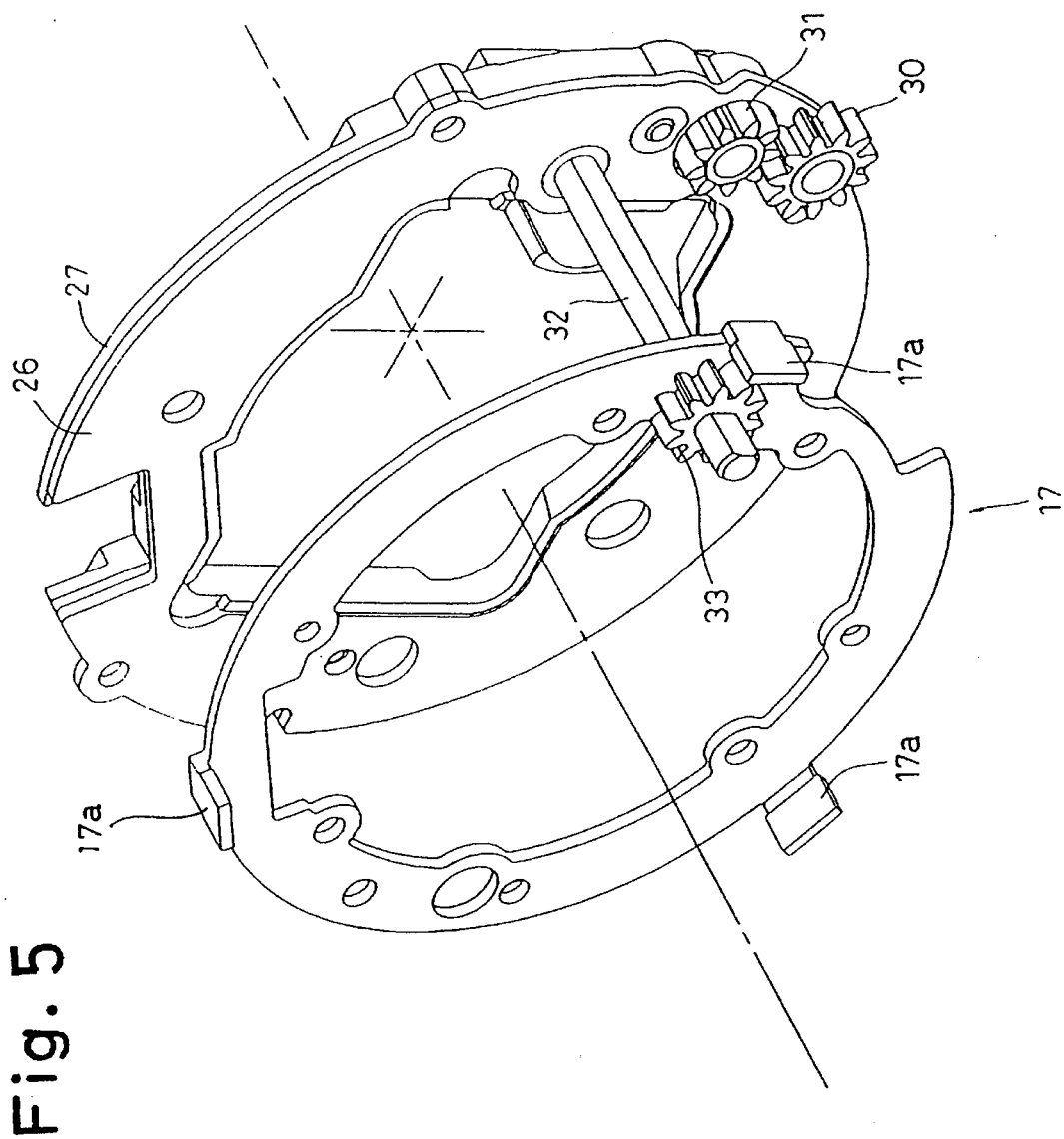
FIG. 5 is a isometric view of an supporting mechanism for a driving system of the lens barrel to which the present invention is applied.
Figure 6:
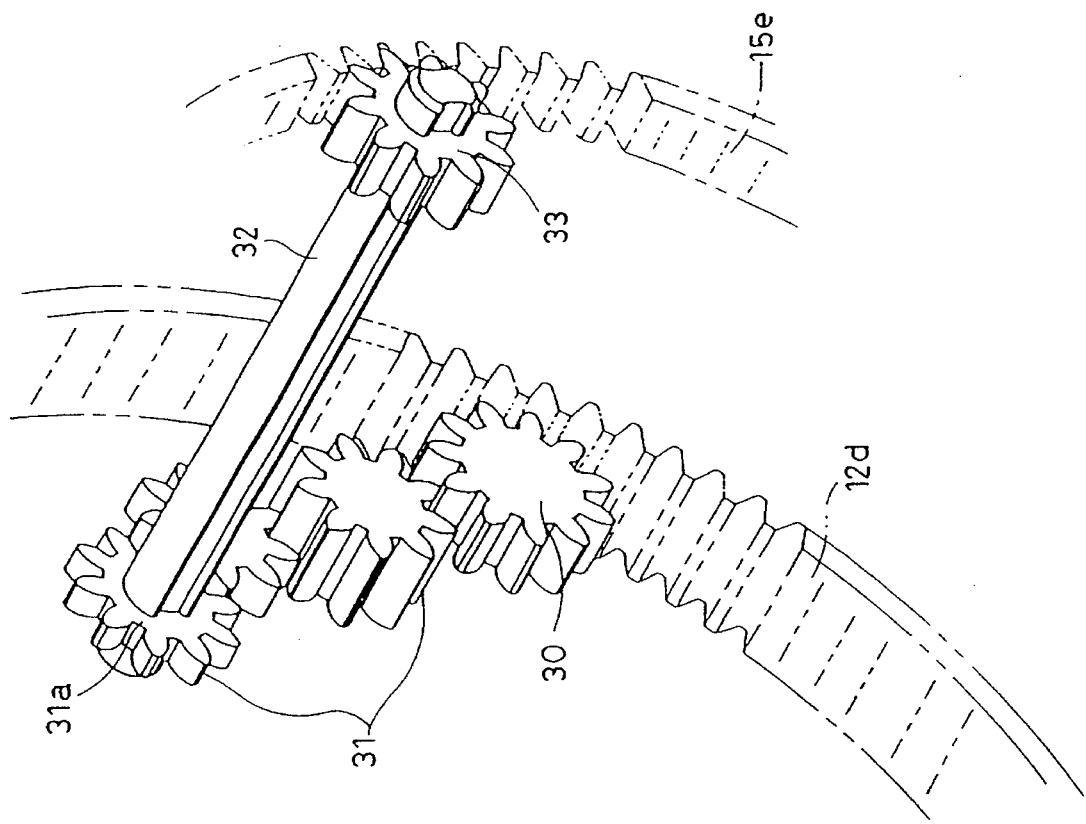
FIG. 6 is an isometric view of gears of the driving system shown in FIG. 5.

Next, a driving mechanism for rotating the second cylinder 15 will be explained. The driving mechanism transmits the rotation of the rotation cylinder 12 to the second cylinder 15. A pair of gear supporting plates 26 and 27 are secured to the rear end of the first cylinder 14 through fastening screws 29. A pinion 30 meshing with the inclined inner gear 12d of the rotation cylinder 12 is rotatably attached to the gear supporting plate 26 as shown in FIGS. 5 and 6. Between the two straight keys 14a formed on the rear end portion of the first cylinder 14 in the circumferential direction is formed a straight guide projection 14a' having a space 14e for accommodating a pinion 30, a illustrated in FIG. 3. A part of teeth of the pinion 30 accommodated in the space 14e projects from the outer periphery of the first cylinder 14. The inclined inner gear 12d of the rotation cylinder 12 is parallel to the lead grooves 12c, so that the engagement between the pinion 30 and the inclined inner gear 12d is maintained, even when the first cylinder 14 moves in the direction of the optical axis O due to the rotation of the cylinder 12. A gear train 31 receiving the rotation of the pinion 30 is supported between the gear supporting plates 26 and 27, and a rotation transmitting shaft 32 which forwardly extends along the optical axis O is integrally formed with a final gear 31a of the gear train 31. The shaft 32 has a uniform cross section which is not round.

A pinion 33 is supported on the guide plate 17 fixed to the rear end face of the guide member 16. The pinion 33 fits on the shaft 32 such that the pinion 33 is slidable on the shaft 32 in the axial direction thereof, but does not rotate with respect to the shaft 32. In other words, the pinion 33 is movable with respect to the shaft 32 in the axial direction thereof and rotatable together with the shaft 32. Thus, the pinion 33 moves along the shaft 32 together with the guide plate 17 (and the second cylinder 15) when the second cylinder 15 moves in the direction of the optical axis O. The pinion 33 meshes with a circumferential inner gear 15e which is formed on the inner surface of the second cylinder 15. Therefore, the rotation of the rotation cylinder 12 is transmitted to the second cylinder 15 through the inclined inner gear 12d, the pinion 30, the gear train 31, the rotation transmitting shaft 32, the pinion 33 and the circumferential inner gear 15e, regardless of the position of the first cylinder 14 in the direction of the optical axis O.

In the zoom lens barrel with the above construction according to the present invention, when the rotation cylinder 12 is rotated in the forward or reverse direction, the first cylinder 14 moves in the direction of the optical axis O and the second cylinder 15 rotates. The rotation of the second cylinder 15 allows the second cylinder 15 itself to move in the optical axis direction O, and the front lens group L1 and the rear lens group L2 to linearly move while changing the distance between the two lens group to thereby effect zooming.

A ring-shaped barrier driving member 43 and the shutter block 20 are inserted into the front lens group supporting cylinder 22 from the rear thereof. A decorative plate 42 is attached to the front end of the front lens group supporting cylinder 22. The decorative plate 42 is provided in the center thereof with an opening 35a. A frame 42a is attached to the rear of the decorative plate 42. The frame 42a is provided in the center thereof with an opening 35b opposing the opening 35a. The openings 35a and 35b constitute the lens opening 35. A space S is formed between the frame 42a and the decorative plate 42. The frame 42a (or the decorative plate 42) is provided with rotating support pins 37a and 37b projecting into the space S and each extending in a direction parallel to the optical axis O. In the space S, two barrier blades 36a and 36b placed symmetrically about the optical axis O are rotatably supported by the pins 37a and 37b, respectively. Each of the barrier blades 36a and 36b is always biased by a torsion spring (not shown) is the direction where the lens opening 35 is closed.

The lens support ring 23 with a male helicoid 23a engaging the female helicoid 20a of the shutter block 20 is further provided on the front end thereof with a male helicoid 23c having a diameter larger than that of the male helicoid 23a. The lends supporting ring 23 and a lens fixing frame 40 constitute a front lens frame 45. The lens fixing ring 40 is provided with an inner female helicoid 40a which is engaged with the male helicoid 23c. The lens fixing ring 40 prevents the front lens group L1 from coming off the lens supporting ring 23 through the engagement of an inner flange 40b of the ring 40 at the front end portion thereof with an edge the outer periphery of the front lens group L1.

Figure 9:
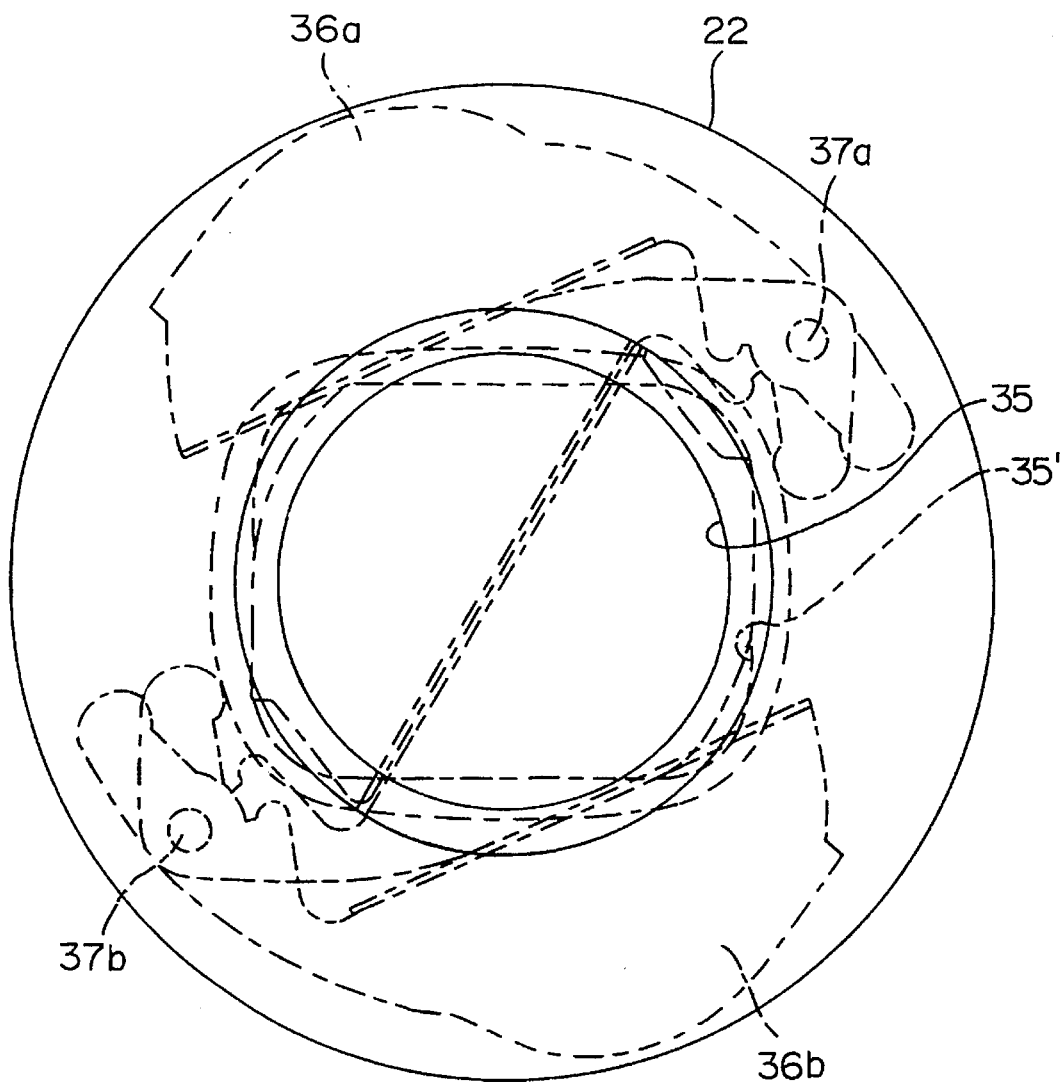

The front lens group L1, which moves in the direction of the optical axis O together with the rear lens group L2 to change a focal length, carries out a focusing operation by projecting from an infinite focus position indicated by solid lines in FIG. 7 to a shortest focus position indicated by two-dot chain lines in FIG. 7. The shape of the lens opening 35 is defined such that the front lens group L1 and the front lens frame 45 (i.e., a front end of lens fixing frame 40) are able to project forwardly through the lens opening 35 as indicated by the two-dot chain lines in FIG. 7 when the front lens group L1 projects to the shortest focus position. The lens opening 35 is a circular opening, the shape of which is similar to the front lens group L1. When extended to the shortest focus position, the front ends of the front lens group L1 and front lens frame 45 project forwardly from the imaginary plane on which the retreated barrier blades 36a and 36b are located. The shape of the lens opening 35 may be another shape which allows the front lens group L1 and the front lens frame 45 (i.e., a front end of lens fixing frame 40) to project forwardly through the lens opening 35. Reference numeral 35' in FIG. 9 shows a conventional lens opening incapable of causing the front lens group L1 to project forwardly. However, if the conventional rectangular lens opening is laterally enlarged, it may be used as lens opening of the present invention since it allows the lens fixing frame 40 to project forwardly.

As described above, with the camera to which the present invention is applied, the lens opening 35 allows the front lens group L1 and the front lens frame 45 supporting the front lens group L1 to forwardly project through the lens opening 35. As a result, the space required in the conventional camera at the extension of the lens can be eliminated, which allows a thin camera body when the lens barrel is accommodated in the camera body, contributing to the miniaturization of the camera.

When in the accommodated state illustrated in FIG. 7, pictures can not be taken even though the front lens group L1 is in the infinite focus position. The lens fixing frame 40 indicated by the two-dot chain lines in FIG. 7 shows a theoretical condition where the front lens group L1 in the accommodated state is extended.

As described above, with the camera to which the present invention is applied, the space required for projecting the focusing lens group in conventional cameras can be eliminated, which enables the thickness of the camera body to be thin when the lens is accommodated in the camera body, contributing to the miniaturization of the camera body.

We claim:

1. A camera having a lens barrel movable along an optical axis of the camera, comprising:

a photographic optical system provided in said lens barrel, said photographic optical system including a focusing lens group located at a front end of said photographic optical system;

a lens frame provided in said lens barrel for supporting said focusing lens group, said lens frame protecting forwardly from an infinite focus position to a shortest focus position for a focusing operation; and a lens opening provided on a front part of said lens barrel, said lens opening exposing said focusing lens group to an outside of said lens barrel, wherein said lens opening is formed so as to allow said lens frame to project forwardly through said lens opening when said lens frame moves to said shortest focus position.

2. The camera of claim 1, further comprising:

barrier blades provided in said lens barrel, said barrier blades movable between an open position and a closed position for opening and closing said lens opening, respectively, wherein said lens frame projects forwardly beyond an imaginary plane on which said barrier blades are located in said open position when said lens frame projects to said shortest focus position.

3. The camera of claim 1, wherein said lens opening is formed in a circular shape.

4. The camera of claim 1, wherein said front part of said lens barrel comprises a front lens group supporting cylinder movable with respect to the camera to move said lens frame;

wherein said lens frame projects from said front lens group supporting cylinder when said lens frame forwardly projects through said lens opening.

5. The camera of claim 1, wherein said lens barrel moves along said optical axis during a zooming operation.

6. A lens shutter type camera having a lens barrel movable along an optical axis of the camera, comprising:

a photographic optical system provided in said lens barrel, said photographic optical system including a focusing lens group located at a front end of said photographic optical system;

a lens frame provided in said lens barrel for supporting said focusing lens group, said lens frame forwardly projecting from an infinite focus position to a shortest focus position for a focusing operatoin;

a lens opening provided on a front part of said lens barrel, said lens opening exposing said focusing lens group to an outside of said lens barrel; and barrier means provided in said lens barrel for protecting said photographic optical system, wherein said barrier means includes at least one barrier blade for opening and closing said lens opening, wherein said barrier means is placed at a position where said at least one barrier blade, when closing said lens opening, intersects a position of said lens frame when said lens frame moves to said shortest focus position.

7. The lens shutter type camera of claim 6, wherein said lens opening is formed to be large enough to allow said lens frame to project forwardly through said lens opening when said lens frame moves to said shortest focus position.

8. The camera of claim 6, wherein said lens barrel comprises a front lens group supporting cylinder within which said lens frame is movable;

said camera further comprising a barrier frame mounted to an end of said front lens group supporting cylinder.

9. The camera of claim 8, wherein said barrier means open to allow said lens frame to project therethrough, through said lens opening.

10. The camera of claim 6, wherein said lens barrel moves along said optical axis during a zooming operatoin.

11. A lens shutter type camera having a lens barrel movable along an optical axis of the camera, and an auto-focus mechanism, said camera comprising:

a lens frame provided in said lens barrel for supporting a frontmost lens of a photographic optical system, said auto-focus mechanism driving said lens frame to move forward from an infinite focus position to a shortest focus position; and a lens opening provided in said lens barrel, said lens opening exposing said frontmost lens to outside said lens barrel, wherein said lens opening is formed larger than said lens frame so that said lens frame may project forward through said lens opening when said auto-focus mechanism drives said lens frame to move to said shortest focus position.

12. The camera of claim 11, wherein said lens barrel comprises a front lens group supporting cylinder movable with respect to the camera to move said lens frame;

wherein said lens frame projects from said front lens group supporting cylinder when said auto-focus mechanism drives said lens frame to move to said shortest focus position.

13. The camera of claim 11, wherein said lens barrel moves along said optical axis during a zooming operation.

14. A camera, comprising:

a lens barrel containing a focusing lens group, said lens barrel being movable along an optical axis of said camera;

a lens frame for supporting said focusing lens group, wherein said lens frame is contained within said lens barrel and is movable with respect thereto along an axis of said lens barrel;

wherein said lens frame is capable of projecting forwardly from an infinite focus position to a shortest focal length position; and where said lens frame projects from a front end of said lens barrel when said lens frame moves to said shortest focal length position.

15. The camera of claim 14, further comprising:

a barrier frame mounted to said front end of said lens barrel; and barrier means provided within said barrier frame, for protecting said focusing lens group;

wherein said barrier means open to allow said lens frame to project therethrough, through a lens opening.

16. A camera comprising:

a camera body;

a lens barrel extending from an inside of said camera body to an outside of said camera body through an opening in said camera body;

a photographic optical system provided in said lens barrel, said photographic optical system including a focusing lens group located at a front end of said photographic optical system; and a lens opening provided on a front part of said lens barrel, said lens opening exposing said focusing lens group to an outside of said lens barrel, so as to allow said focusing lens group to project forwardly through said lens opening during a focusing operation.

17. The camera of claim 16, further comprising:

a lens frame provided in said lens barrel for supporting said focusing lens group, said lens frame projecting forwardly from an infinite focus position to a shortest focus position during a focusing operation, said focusing lens group projecting forwardly through said lens opening when said focusing lens group moves to said shortest focus position.

18. The camera of claim 16, further comprising:

a barrier frame mounted to said front end of said lens barrel; and barrier means provided within said barrier frame, for protecting said focusing lens group;

wherein said barrier means open to allow said focusing lens group to project therethrough, through said lens opening.

19. The camera of claim 18, wherein said lens opening is formed in a substantially circular shape.

* * * * *

UNITED STATES PATENT AND TRADEMARK OFFICE
CERTIFICATE OF CORRECTION

PATENT NO.    :   5,598,241
DATED         :   January 28, 1997
INVENTOR(S)   :   H. NOMURA et al.

It is certified that error appears in the above-indentified patent and that said Letters Patent is hereby corrected as shown below:

Cover page, in section [56], "References Cited", "U.S. PATENT DOCUMENTS", insert ---B1 4,944,030 7/1990 Haraguchi et al.---.

Signed and Sealed this

Twentieth Day of May, 1997

Attest:

BRUCE LEHMAN

*Attesting Officer*      *Commissioner of Patents and Trademarks*